(12) United States Patent
Liu et al.

(10) Patent No.: US 7,659,647 B2
(45) Date of Patent: Feb. 9, 2010

(54) LINEAR ACTUATOR

(75) Inventors: Quan Liu, La Mirada, CA (US); Xiaoxiang Zhang, La Mirada, CA (US); Jianming Qiu, Shanghai (CN); Yanjun Zhang, Shanghai (CN)

(73) Assignee: I-Trust Better Life Corp, Buena Park, CA (US)

( * ) Notice: Subject to any disclaimer, the term of this patent is extended or adjusted under 35 U.S.C. 154(b) by 440 days.

(21) Appl. No.: 11/765,582

(22) Filed: Jun. 20, 2007

(65) Prior Publication Data

US 2008/0315728 A1    Dec. 25, 2008

(51) Int. Cl.
*H02K 7/06* (2006.01)
*H02K 7/10* (2006.01)

(52) U.S. Cl. .................... 310/80; 310/77; 310/83; 310/92; 310/93; 310/20

(58) Field of Classification Search ........... 310/80, 310/92, 93, 77, 83, 20
See application file for complete search history.

(56) References Cited

U.S. PATENT DOCUMENTS

| | | | | |
|---|---|---|---|---|
| 816,506 | A * | 3/1906 | Shelton | 601/87 |
| 973,216 | A * | 10/1910 | Rowe | 173/117 |
| 1,203,138 | A * | 10/1916 | Schuler | 310/80 |
| 2,715,688 | A * | 8/1955 | Hacker | 310/93 |
| 5,620,077 | A * | 4/1997 | Richard | 192/12 D |
| 6,211,591 | B1 | 4/2001 | Kowalski et al. | |
| 6,731,034 | B1 | 5/2004 | Habele et al. | |
| 7,047,834 | B2 * | 5/2006 | Nielsen et al. | 74/89.38 |
| 7,137,489 | B2 | 11/2006 | Bastholm et al. | |
| 2005/0173209 | A1 * | 8/2005 | Bastholm et al. | 188/156 |

FOREIGN PATENT DOCUMENTS

| | | | |
|---|---|---|---|
| CN | 2417264 Y | | 1/2001 |
| CN | 2589749 Y | | 12/2003 |
| CN | 1584354 A | | 2/2005 |
| CN | 101022233 A | * | 8/2007 |
| CN | 201018350 Y | * | 2/2008 |
| DE | 3028580 A | * | 2/1982 |
| EP | 718958 A2 | * | 6/1996 |
| JP | 61030932 A | * | 2/1986 |
| JP | 63214530 A | * | 9/1988 |
| JP | 10077179 A | * | 3/1998 |
| JP | 11263117 A | * | 9/1999 |

* cited by examiner

*Primary Examiner*—Quyen Leung
*Assistant Examiner*—Alex W Mok
(74) *Attorney, Agent, or Firm*—Morris, Manning & Martin LLP; Tim Tingkang Xia

(57) ABSTRACT

An actuator. In one embodiment, the actuator comprises a reversible electric motor having a stator having a housing, a rotor housed in the housing of the stator, and a shaft having a forward portion and a rearward portion extending oppositely and coaxially from the rotor, respectively; a fan member coaxially attached to the forward portion or the rearward portion of the motor shaft such that the fan member is operable simultaneously with the rotor of the reversible electric motor; and an electromagnetic brake movable between a first position and a second position, positioned in relation to the fan member such that when the electromagnetic brake is in the first position, the fan member is rotatable with the rotor of the reversible electric motor, and when the electromagnetic brake is in the second position, the fan member stops rotating firmly, thereby causing the motor stops instantly.

20 Claims, 4 Drawing Sheets

LINEAR ACTUATOR

FIELD OF THE INVENTION

The present invention generally relates to an actuator and in particular to a linear actuator having a dual functional fan member and an electromagnetic brake.

BACKGROUND OF THE INVENTION

Driving of an instrument or furniture such as, for example, a robot, a hospital bed, a lift chair or the like often requires an actuator that is configured to convert a rotary motion into a reciprocating linear motion. For such an actuator, a reversible electric motor is utilized to generate the rotary motion and a transmission member is coupled to the electric motor so as to convert the rotary motion of the electric motor into the reciprocating linear motion of the actuator. Typically, the electric motor has a rotor. When the electric motor is activated, the rotor rotates along its axis for generating the rotary motion. When the electric motor is deactivated, it is desirable that the rotor would instantly stop from rotating. However, the rotation inertia of the rotor may make it continuously rotate until it firmly stops even the electric motor is deactivated, thereby causing the deviation of the linear motion of the actuator.

In certain applications, the precise control of a linear motion of an actuator is required. This can be achieved by a brake member that is constructed to lock a rotor of an electric motor from rotating when the electric motor is deactivated, and to release the rotor of the electric motor for rotating when the electric motor is activated. There are two types of brakes, a mechanical brake and electromagnetic brake, which are utilized in the conventional actuators. Usually, these brakes are structurally and operably very complicated, and difficult and costly in fabrication. Additionally, the electromagnetic brake, in operation, is much noised.

On the other hand, when the electric motor operates, its rotor is rotating back and forth rapidly, thereby generating heat therein. The generated heat may cause the motor to be malfunctioned or damaged. Therefore, it is desirable for an actuator to have a cooling means for cooling the electric motor in operation.

Therefore, a heretofore unaddressed need exists in the art to address the aforementioned deficiencies and inadequacies.

SUMMARY OF THE INVENTION

The present invention, in one aspect, relates to an actuator for converting a rotating motion into a linear reciprocating motion. In one embodiment, the actuator includes a reversible electric motor. The reversible electric motor has a stator having a housing, a rotor having an axis and housed in the housing of the stator, and a shaft having a forward portion and a rearward portion extending oppositely and coaxially from the rotor, respectively. The rotor is reversibly rotatable relative to the stator.

The actuator further includes a transmission member coupled to the reversible electric motor for converting the rotating motion of the reversible electric motor into a linear reciprocating motion. In one embodiment, the transmission member comprises a spindle that is configured to be telescopically movable along a direction perpendicular to the axis of the motor shaft. The spindle is driven by the reversible electric motor. The actuator also includes a fan member coaxially attached to the forward portion or the rearward portion of the motor shaft such that the fan member is operable simultaneously with the rotor of the reversible electric motor. The fan member in one embodiment has a hub, a periphery rim and a plurality of vanes connected therebetween, where the hub defines a bore for receiving the forward portion or the rearward portion of the motor shaft.

Moreover, the actuator includes an electromagnetic brake. The electromagnetic brake comprises (i) a brake frame having a first end portion and an opposite, second end portion and a body portion defined therebetween, wherein the body portion defines a chamber having an axis therethrough the first and second end portions; (ii) first and second magnets, wherein the first magnet is rigidly placed in the camber by the first end portion of the brake frame, and wherein the second magnet is placed in the chamber by the second end portion of the brake frame and is movable between a first position to a second position in the chamber, wherein when the second magnet is in the first position, it is proximal to the first magnet, and when the second magnet is in the second position, it is distal from the first magnet; and (iii) a coil wound on the exterior surface of the body portion of the brake frame, configured such that when the electric motor is activated, the coil is energized, thereby causing the second magnet to move from the second position to the first position, and when the motor is deactivated, the coil is deenergized, thereby causing the second magnet to move from the first position to the second position. The electromagnetic brake is positioned in relation to the fan member such that when the second magnet of the electromagnetic brake is in the first position, the fan member is rotatable with the rotor of the reversible electric motor, and when the second magnet of the electromagnetic brake is in the second position, the fan member stops rotating firmly, thereby causing the rotor of the reversible electric motor stops instantly. The electromagnetic brake further has a brake member attached to an end of the second magnet such that when the second magnet of the electromagnetic brake is in the second position, the braking member is in contact with the exterior surface of the periphery rim of the fan. The electromagnetic brake also has a spring wound around a portion of the second magnet and positioned between the second end portion of the brake frame and the brake member such that when the coil is energized, an attracting force is induced in the first magnet that is against a resilient force of the spring and attracts the second magnet moving toward the first position, and when the coil is deenergized, no force is induced and the resilient force of the spring causes the second magnet to move toward the second position.

Additionally, the actuator includes a circuit electrically coupled to the reversible electric motor and configured to activate and deactivate the reversible electric motor. The electromagnetic brake is electrically coupled to the circuit such that the activation and deactivation of the reversible electric motor cause the coil of the electromagnetic brake to be energized and deenergized, respectively. In one embodiment, the electromagnetic brake is positioned over the periphery rim of the fan member such that the axis of the electromagnetic brake is perpendicular to the axis of the motor shaft.

In another aspect, the present invention relates to an actuator. In one embodiment, the actuator has a reversible electric motor having a stator having a housing, a rotor housed in the housing of the stator, and a shaft having a forward portion and a rearward portion extending oppositely and coaxially from the rotor, respectively, wherein the rotor is rotatable relative to the stator; a fan member coaxially attached to the forward portion or the rearward portion of the motor shaft such that the fan member is operable simultaneously with the rotor of the reversible electric motor; and an electromagnetic brake movable between a first position and a second position, positioned in relation to the fan member such that when the electromagnetic brake is in the first position, the fan member is rotatable with the rotor of the reversible electric motor, and when the electromagnetic brake is in the second position, the fan member stops rotating firmly, thereby causing the motor stops instantly.

Furthermore, the actuator has a transmission member coupled to the reversible electric motor for converting the rotating motion of the reversible electric motor into a linear reciprocating motion. In one embodiment, the transmission member comprises a spindle that is configured to be telescopically movable along a direction perpendicular to the axis of the motor shaft. The spindle is driven by the reversible electric motor.

Moreover, the actuator has a circuit electrically coupled to the reversible electric motor and configured to activate and deactivate the reversible electric motor.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
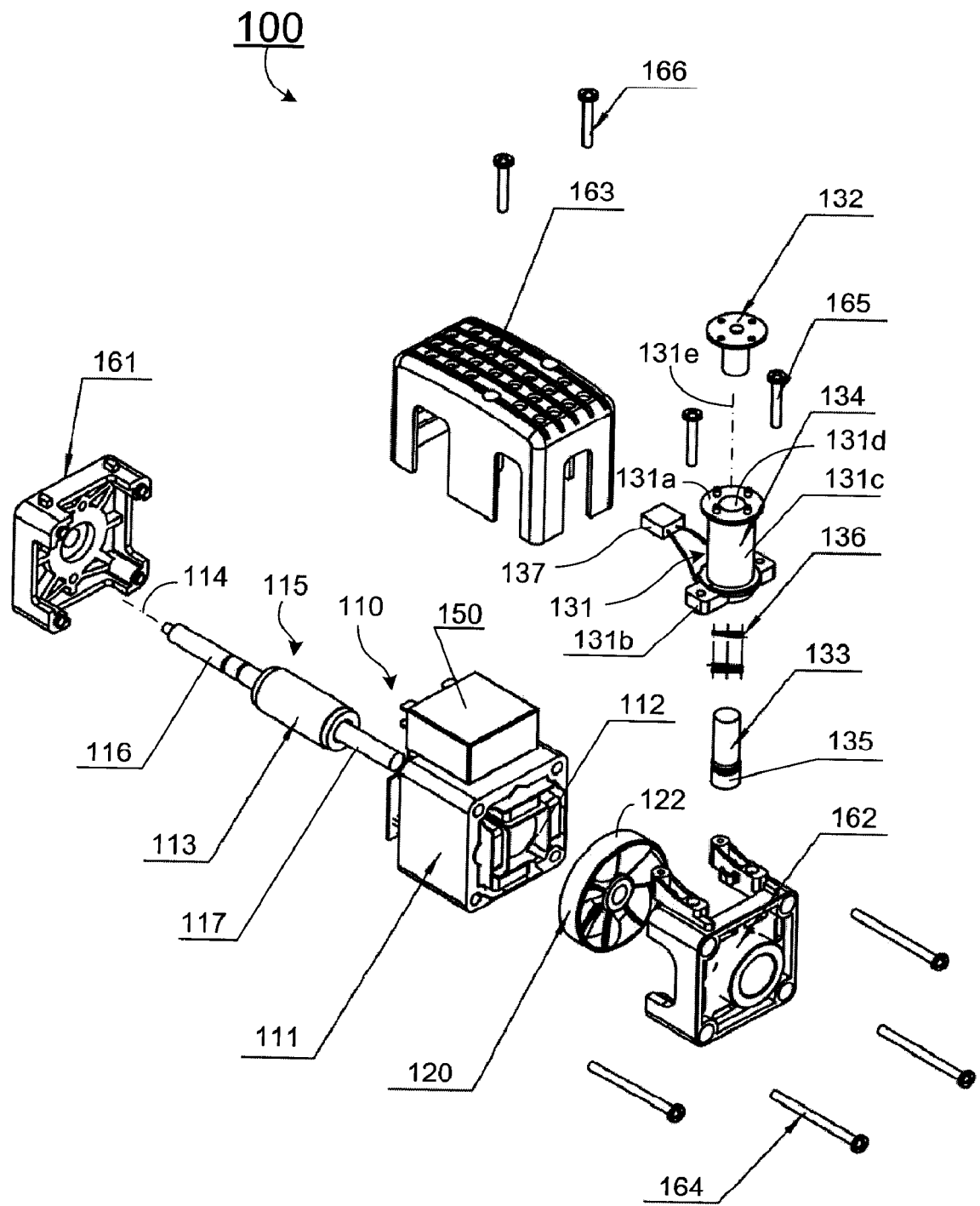
FIG. 1 shows partially an exploded view of an actuator according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings FIGS. 1-4. In accordance with the aspects of this invention, as embodied and broadly described herein, this invention, in one aspect, relates to an actuator for converting a rotating motion into a linear reciprocating motion. The actuator is usable in a support frame for use in a lift chair, and other applications.

Figure 2:
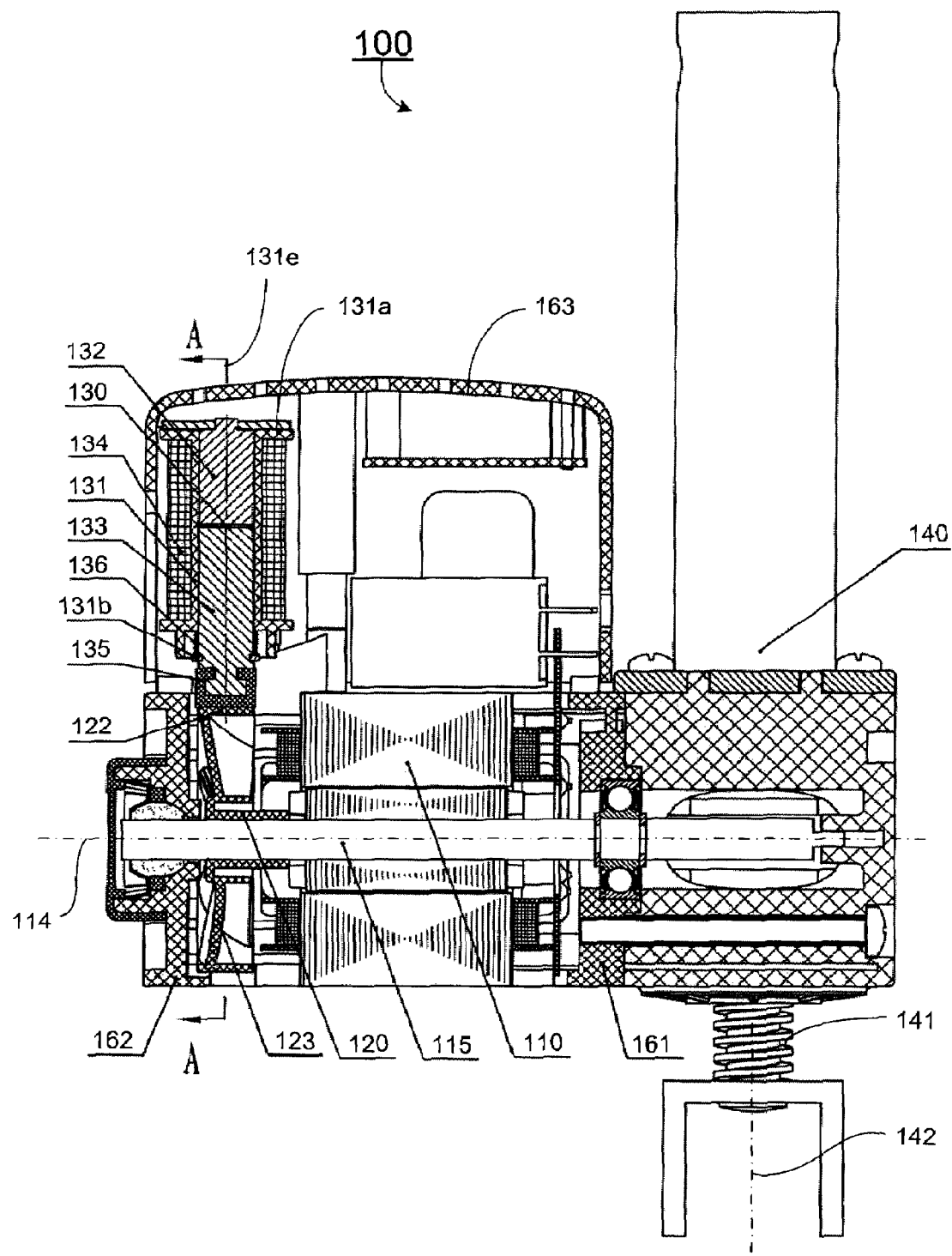
FIG. 2 shows a cross-sectional view of the actuator shown in FIG. 1.
Figure 3:
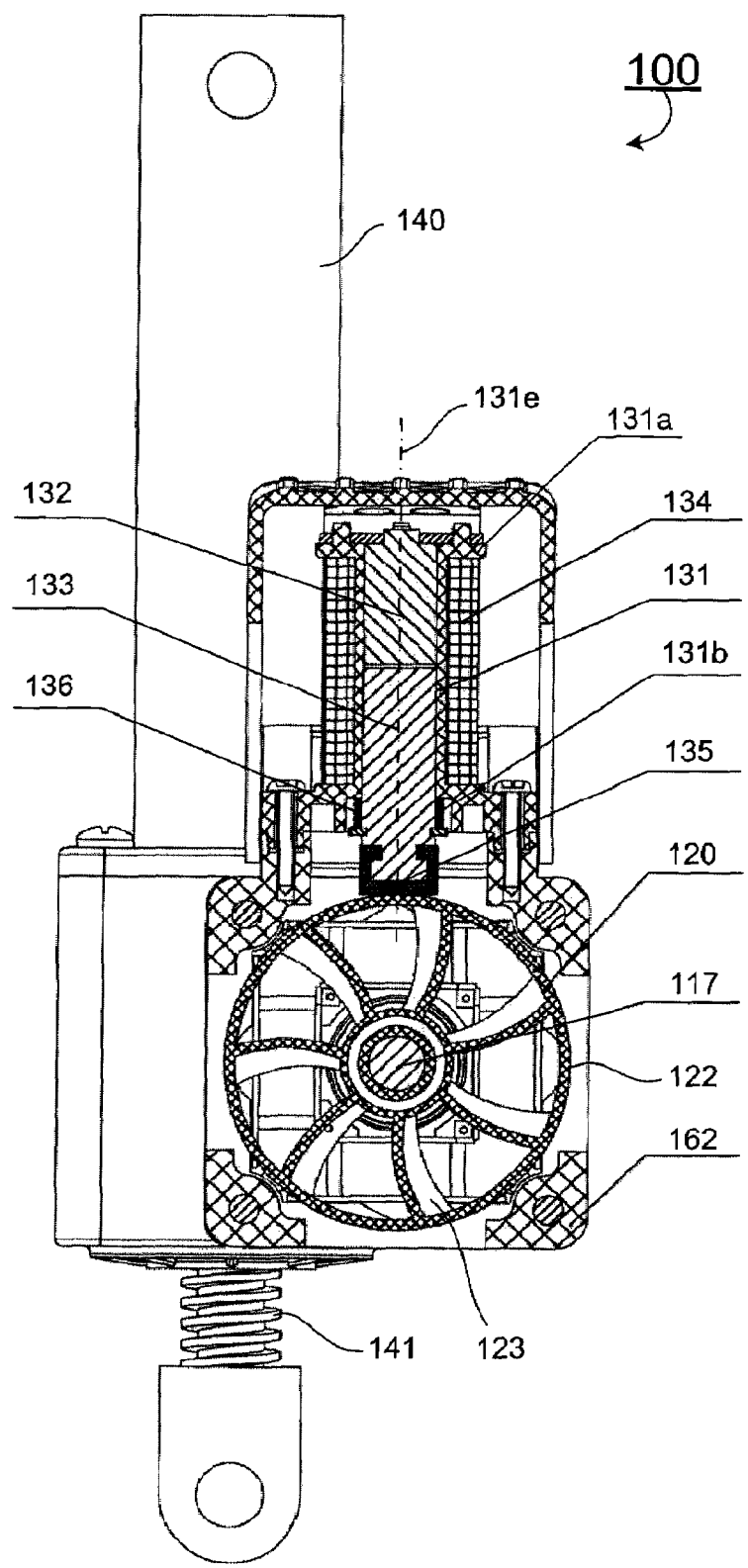
FIG. 3 shows another cross-sectional view of the actuator shown in FIG. 1.

Referring to FIG. 1-3, an actuator 100 is shown according to one embodiment of the present invention. The actuator 100 has a reversible electric motor 110, a fan member 120, an electromagnetic brake 130, a transmission member 140, and a circuit unit 150.

The reversible electric motor 110 has a stator 111 having a housing 112, a rotor 113 having an axis 114, and a shaft 115 having a forward portion 116 and a rearward portion 117 extending oppositely and coaxially from the rotor 113, respectively. Both the shaft 115 and the rotor 113 are formed to a co-axis 114. As assembled, the rotor 113 is received in the housing 112 of the stator 111, and is reversibly rotatable relative to the stator 111.

Figure 4:
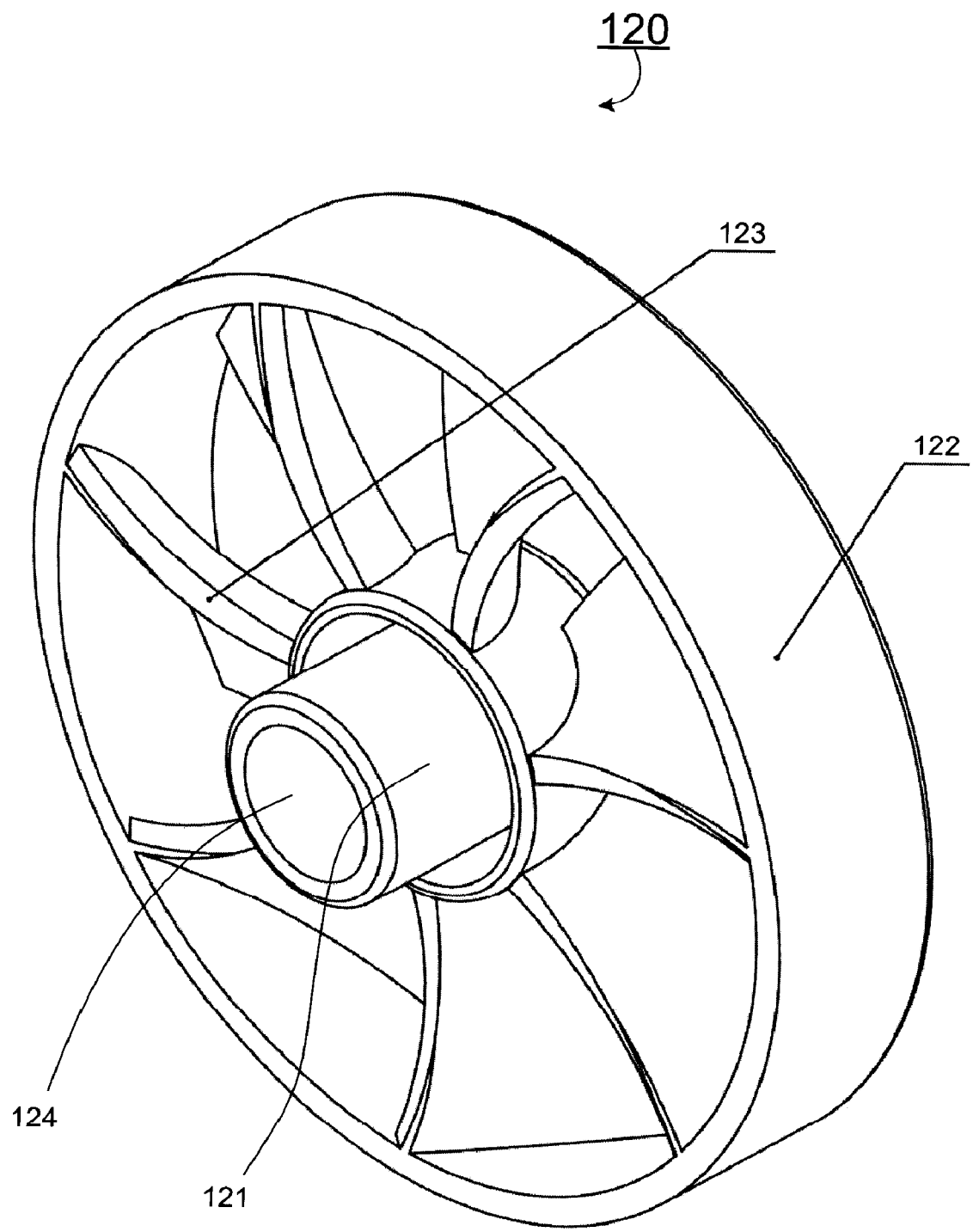
FIG. 4 shows a perspective view of a fan member utilized in the actuator shown in FIG. 1.

As shown in FIG. 4, the fan member 120 has a hub 121, a periphery rim 122 and a plurality of vanes 123 connected therebetween. The hub 121 defines a bore 124. The fan member 120 is engaged with the motor shaft 115 by inserting the rearward portion 117 of the motor shaft 115 through the bore 124 of the fan member 120. The fan member 120 can also be mounted to the forward portion 116 of the motor shaft 115. The fan member 120, as assembled, is operable simultaneously with the rotor 113 of the reversible electric motor 110. In other words, the fan member 120 rotates as the rotor 113 of the reversible electric motor 110 rotates (the electric motor 110 is activated), and the fan member 120 stops as the rotor 113 of the reversible electric motor 110 stops (the electric motor 110 is deactivated). According to the present invention, the fan member 120 is employed as a cooling means for cooling down the electric motor 110 when it is activated. Moreover, as shown below, the fan member 120, together with the electromagnetic brake 130, can also be utilized as a braking means for forcing the electric motor 110 to stop rotating. The fan member 120 can be made of plastic or other durable materials.

The electromagnetic brake 130 has a brake frame 131 having a first end portion 131a and an opposite, second end portion 131b and a body portion 131c defined therebetween. The body portion 131c defines a chamber 131d having an axis 131e therethrough the first end portion 131a and the second end portion 131b. The electromagnetic brake 130 also includes a first magnet 132 and a second magnet 133. The first magnet 132 is rigidly placed in the camber 131d by the first end portion 131a of the brake frame 131. The second magnet 133 is placed in the chamber 131d by the second end portion 131b of the brake frame 131 and is movable between a first position and a second position in the chamber 131d, along the axis 131e of the chamber 131d. When the second magnet 133 is in the first position, it is proximal to the first magnet 132, and when the second magnet 133 is in the second position, it is distal from the first magnet 132. In one embodiment as shown in FIGS. 1-3, the chamber 131d, the first magnet 132 and the second magnet 133 are formed in the form of a cylinder. The first magnet 132 and the second magnet 133 are assembled to have a co-axis that is substantially coincident with the axis 131e of the chamber 131d.

The electromagnetic brake 130 also includes a coil 134 wound on the exterior surface of the body portion 131c of the brake frame 131. The coil 134 is electrically coupled to the circuit unit 150 by a connector 137 and configured such that when the electric motor 110 is activated, the coil 134 is energized, and when the motor 110 is deactivated, the coil 134 is deenergized.

The electromagnetic brake 130 further has a brake member 135 attached to an end of the second magnet 133 such that when the second magnet 133 of the electromagnetic brake 130 is in the second position, the braking member 135 is in contact with the exterior surface of the periphery rim 122 of the fan member 120. The brake member 135 is employed to generate an effective friction force between the electromagnetic brake 130 and the fan member 120 so as to stop the motor from rotating when the second magnet 133 is in the second position. Therefore it is preferably formed of plastic such as rubbers.

The electromagnetic brake 130 also has a spring 136 wound around a portion of the second magnet 133 and positioned between the second end portion 131b of the brake frame 131 and the brake member 135. In operation, when the coil 134 is energized, an attracting force is induced in the first magnet 132 that attracts the second magnet 133, against the resilient force of the spring 136, moving toward the first position. When the coil 134 is deenergized, no force is induced and the resilient force of the spring 136 causes the second magnet 133 to move toward the second position. Therefore, when the electric motor 110 is deactivated, the coil 134 is deenergized, whereby the second magnet 133 of the electromagnetic brake 130 moves instantly to the second position, causing the fan member 120 to stop inertia-related rotating, which in turn forces the rotor 113 of the electric motor 110 to stop rotating.

According to the present invention, the electromagnetic brake 130 is positioned over the in the periphery rim 122 of the fan member 120 such that the axis 131e of the electromagnetic brake 130 is perpendicular to the axis 114 of the motor shaft 115. When the second magnet 133 of the electromagnetic brake 130 is in the first position, the fan member 120 is rotatable with the rotor 113 of the reversible electric motor 110, and when the second magnet 133 of the electromagnetic brake 130 is in the second position, the fan member 120 stops rotating firmly, thereby causing the rotor 113 of the reversible electric motor 110 stops instantly.

The transmission member 140 is coupled to the reversible electric motor 110 for converting the rotating motion of the reversible electric motor 110 into a linear reciprocating motion. As shown in FIGS. 2 and 3, the transmission member 140 has a spindle 141 having an axis 142 that is configured to be telescopically movable along the axis 142. The spindle 141 is driven by the reversible electric motor 110. In one embodiment, the spindle 141 is driven by a spline section of the forward portion 116 of the shaft 115 of the reversible electric motor 110.

The circuit unit 150 is electrically coupled to the reversible electric motor 110 and the electromagnetic brake 130, and is configured to activate and deactivate the reversible electric motor 110, which the activation and deactivation of the reversible electric motor 110 cause the coil 134 of the electromagnetic brake 130 to be energized and deenergized, respectively.

The actuator 100 also has a forward cup 161, a rearward cup 162 and a casing 163. As assembled, the forward cup 161 and the rearward cup 162 receive the forward end portion 116 and the rearward end portion 117, respectively, and are secured together by screws 164. The electromagnetic brake 130 is mounted to the rearward cup 162 by screws 165, so that the brake member 135 is positioned over the periphery rim 122 of the fan member 120. The casing 163 is then secured to at least one of the forward cup 161 and the rearward cup 162 by screws 166, to cover the electromagnetic brake 130 and the circuit unit 150 therein. The motor assemble is engaged with the transmission member 140 at the forward cup 161, as shown in FIGS. 2 and 3.

The present invention, among other things, discloses a linear actuator having a dual functional fan member and an electromagnetic brake. The fan member acts as not only a radiator (cooling means) for exhausting heat generated in the electric motor when it is activated, but also a braking means for stopping the rotor of the electric motor from rotating when it is deactivated. The latter improves substantially the motion precision of the actuator. Comparing to the conventional actuators, the invented actuator has its cooling efficiency improved by more than 40%. Furthermore, the transmission efficiency of the invented actuator is improved by more than 25%, compared to the conventional actuators. Additionally, the manufacturing cost of such an actuator is also reduced substantially.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An actuator for converting a rotating motion into a linear reciprocating motion, comprising:
    a. a reversible electric motor having a stator having a housing, a rotor having an axis and housed in the housing of the stator, and a shaft having a forward portion and a rearward portion extending oppositely and coaxially from the rotor, respectively, wherein the rotor is rotatable relative to the stator;
    b. a transmission member coupled to the reversible electric motor for converting the rotating motion of the reversible electric motor into a linear reciprocating motion;
    c. a fan member coaxially attached to the forward portion or the rearward portion of the motor shaft such that the fan member is operable simultaneously with the rotor of the reversible electric motor; and
    d. an electromagnetic brake, comprising:
        (i). a brake frame having a first end portion and an opposite, second end portion and a body portion defined therebetween, wherein the body portion defines a chamber having an axis therethrough the first and second end portions;
        (ii). first and second magnets, wherein the first magnet is rigidly placed in the chamber by the first end portion of the brake frame, and wherein the second magnet is placed in the chamber by the second end portion of the brake frame and is movable between a first position to a second position in the chamber, wherein when the second magnet is in the first position, it is proximal to the first magnet, and when the second magnet is in the second position, it is distal from the first magnet; and
        (iii). a coil wound on the exterior surface of the body portion of the brake frame, configured such that when the electric motor is activated, the coil is energized, thereby causing the second magnet to move from the second position to the first position, and when the motor is deactivated, the coil is deenergized, thereby causing the second magnet to move from the first position to the second position,
    wherein the electromagnetic brake is positioned in relation to the fan member such that when the second magnet of the electromagnetic brake is in the first position, the fan member is rotatable with the rotor of the reversible electric motor, and when the second magnet of the electromagnetic brake is in the second position, the fan member stops rotating firmly, thereby causing the rotor of the reversible electric motor stops instantly.

2. The actuator of claim 1, further comprising a circuit electrically coupled to the reversible electric motor and configured to activate and deactivate the reversible electric motor.

3. The actuator of claim 2, wherein the electromagnetic brake is electrically coupled to the circuit such that the activation and deactivation of the reversible electric motor cause the coil of the electromagnetic brake to be energized and deenergized, respectively.

4. The actuator of claim 1, wherein the fan member comprises a hub, a periphery rim and a plurality of vanes connected therebetween, and wherein the hub defines a bore for receiving the forward portion or the rearward portion of the motor shaft.

5. The actuator of claim 4, wherein the electromagnetic brake is positioned over the periphery rim of the fan member such that the axis of the electromagnetic brake is perpendicular to the axis of the motor shaft.

6. The actuator of claim 5, wherein the electromagnetic brake further comprises a brake member attached to an end of the second magnet such that when the second magnet of the electromagnetic brake is in the second position, the braking member is in contact with the exterior surface of the periphery rim of the fan.

7. The actuator of claim 6, wherein the electromagnetic brake further comprises a spring wound around a portion of the second magnet and positioned between the second end portion of the brake frame and the brake member such that when the coil is energized, an attracting force is induced in the first magnet that is against a resilient force of the spring and attracts the second magnet to move toward the first position, and when the coil is deenergized, no force is induced and the resilient force of the spring causes the second magnet to move toward the second position.

8. The actuator of claim 1, wherein the transmission member comprises a spindle configured to be telescopically movable along a direction perpendicular to the axis of the motor shaft.

9. The actuator of claim 8, wherein the spindle is driven by the reversible electric motor.

10. An actuator, comprising:
    a. a reversible electric motor having a stator having a housing, a rotor having an axis and housed in the housing of the stator, and a shaft having a forward portion and a rearward portion extending oppositely and coaxially from the rotor, respectively, wherein the rotor is rotatable relative to the stator;
    b. a fan member coaxially attached to the forward portion or the rearward portion of the motor shaft such that the fan member is operable simultaneously with the rotor of the reversible electric motor; and
    c. an electromagnetic brake movable between a first position and a second position, positioned in relation to the fan member such that when the electromagnetic brake is in the first position, the fan member is rotatable with the rotor of the reversible electric motor, and when the electromagnetic brake is in the second position, the fan member stops rotating firmly, thereby causing the motor stops instantly.

11. The actuator of claim 10, further comprising a circuit electrically coupled to the reversible electric motor and configured to activate and deactivate the reversible electric motor.

12. The actuator of claim 11, wherein the electromagnetic brake comprises:
    a. a brake frame having a first end portion and an opposite, second end portion and a body portion defined therebetween, wherein the body portion defines a chamber having an axis therethrough the first and second end portions;
    b. first and second magnets, wherein the first magnet is rigidly placed in the chamber by the first end portion of the brake frame, and wherein the second magnet is placed in the chamber by the second end portion of the brake frame and is movable between a first position to a second position in the chamber, wherein when the second magnet is in the first position, it is proximal to the first magnet, and when the second magnet is in the second position, it is distal from the first magnet; and
    c. a coil wound on the exterior surface of the body portion of the brake frame, configured such that when the electric motor is activated, the coil is energized, thereby causing the second magnet to move from the second position to the first position, and when the motor is deactivated, the coil is deenergized, thereby causing the second magnet to move from the first position to the second position,
wherein the first and second positions of the second magnet are corresponding to the first and second positions of the electromagnetic brake, respectively.

13. The actuator of claim 12, wherein the electromagnetic brake is electrically coupled to the circuit such that the activation and deactivation of the reversible electric motor cause the coil of the electromagnetic brake to be energized and deenergized, respectively.

14. The actuator of claim 13, wherein the electromagnetic brake further comprises a spring wound around a portion of the second magnet and positioned between the second end portion of the brake frame and the brake member such that when the coil is energized, an attracting force is induced in the first magnet that is against a resilient force of the spring and attracts the second magnet to move toward the first position, and when the coil is deenergized, no force is induced and the resilient force of the spring causes the second magnet to move toward the second position.

15. The actuator of claim 10, wherein the fan member comprises a hub, a periphery rim and a plurality of vanes connected therebetween, and wherein the hub defines a bore for receiving the forward portion or the rearward portion of the motor shaft.

16. The actuator of claim 15, wherein the electromagnetic brake is positioned over the periphery rim of the fan member such that the axis of the electromagnetic brake is perpendicular to the axis of the motor shaft.

17. The actuator of claim 16, wherein the electromagnetic brake further comprises a brake member attached to an end of the second magnet such that when the second magnet of the electromagnetic brake is in the second position, the braking member is in contact with the exterior surface of the periphery rim of the fan.

18. The actuator of claim 10, further comprising a transmission member coupled to the reversible electric motor for converting the rotating motion of the reversible electric motor into a linear reciprocating motion.

19. The actuator of claim 18, wherein the transmission member comprises a spindle configured to be telescopically movable along a direction perpendicular to the axis of the motor shaft.

20. The actuator of claim 19, wherein the spindle is driven by the reversible electric motor.

* * * * *